May 26, 1936. W. H. GREEN 2,041,922

FLUID FLOW CONTROL SYSTEM

Filed June 13, 1935 2 Sheets-Sheet 1

Inventor:
Walt H Green

May 26, 1936.  W. H. GREEN  2,041,922
FLUID FLOW CONTROL SYSTEM
Filed June 13, 1935  2 Sheets-Sheet 2
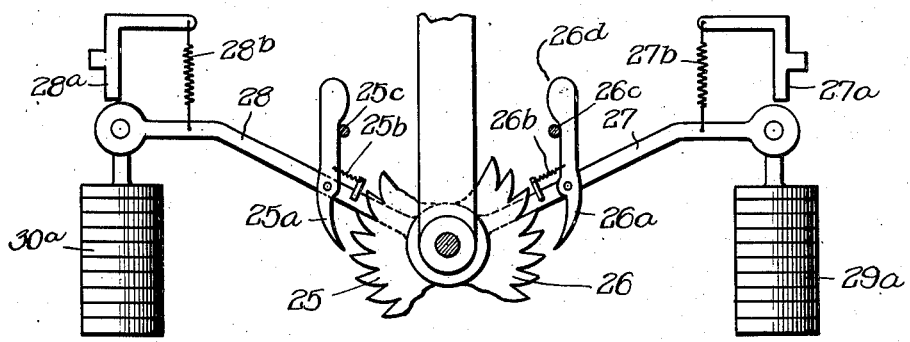
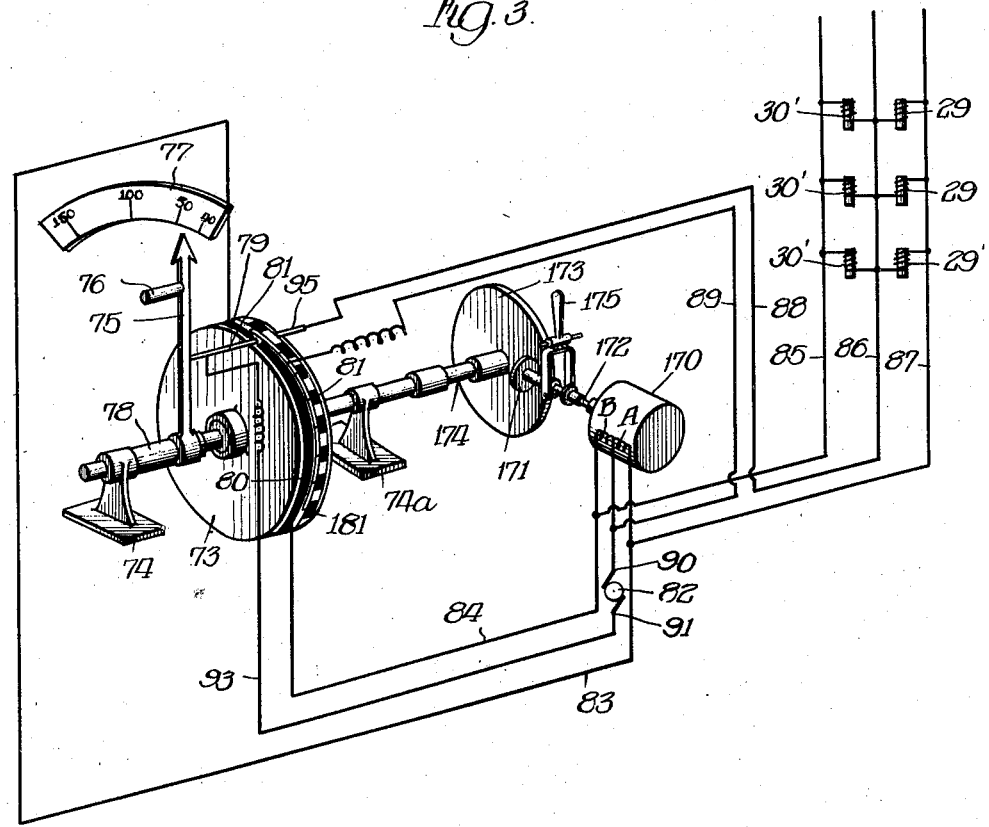
Inventor:
Walter H Green Patented May 26, 1936

2,041,922

UNITED STATES PATENT OFFICE 2,041,922

FLUID FLOW CONTROL SYSTEM

Walter H. Green, Chicago, Ill., assignor to General Zeolite Co., Chicago, Ill., a corporation of Illinois Application June 13, 1935, Serial No. 26,458

20 Claims. (Cl. 137—152.5)

This invention relates to apparatus for the control of fluid flow and as a means thereto to the governing or positioning of a valve or valves and it also includes means for indicating the flow. The flow that is subject to control may be unrelated to any other or it may be one of a group or series that are to be governed together. It is intended also that when there are a group of flows they may all be increased or decreased together through some common setting device or that some one or more of them may be separated from such common device and set separately. One particular object is to provide that when a flow is shut off or when it is to be reset at some new value the adjustment or shift of flow shall take place relatively slowly so that there will be no surges or shocks. While it is contemplated that in the great majority of cases the control will be to the end of maintaining a fixed flow of some set volume per unit of time it will be apparent that the flow or flows can be controlled relative to something else, say to some other flow or a level, by suitable connection.

One particular object is to provide an improved method and means for controlling the effluent flow from a water treating unit such as a filter bed in a filter plant; and because of this and because most of such plants employ a plurality of such beds, the effluent flows from which are usually to be held in unison, and because furthermore it is commonly desirable in such plants to set the rate of flow for all units from a common point, this invention will be described in connection with such a plant. As is well known a typical filter plant of that sort comprises a plurality of filter beds in open-top containers arranged in a row or rows on one or both sides of an operating floor and are provided with the necessary piping and valves for directing and controlling the several flows occurring during operation and ordinarily with gauges for indicating various functions. Experience has long ago shown that during the filtering phase the rate of flow should be held at an even rate and consequently in such plants each bed is commonly provided in the effluent line with what is called a rate of flow controller, by which the rate can be controlled. There are a number of makes or types of such controllers on the market which vary considerably in some features but which have in common certain characteristics. All that are in common use derive a pressure differential from the flow and use this in some way to position a valve to control the flow at the set rate and have some means by which the rate may be set at different values as desired.

While it is desirable to be able to set each controller without relation to the others in such a plant it is also desirable and especially so when a plant comprises a considerable number of units, to be able to revise the setting of all in unison from a common point or setter so as to increase or decrease the delivery of all units together to agree with demand. Various ways have heretofore been used for setting the flow on a controller, usually involving opposing the derived differential to a weight or pressure that could be varied. When means have hitherto been proposed for changing or governing the setting of several controllers from a common point these have correspondingly involved means for shifting or varying the weight or changing the opposing pressure. In my application, Serial No. 616,440, which has now resulted in Patent No. 2,011,049, an improved form of such common control or setting means is described.

In the past when the setting of a controller or group of controllers has been changed this has been done rather abruptly, the weight or pressure being quickly changed to the new value, and the controller or controllers shifting to the new flow in a very short space of time. It is now found that rapid changes from one rate to another are objectionable, the more so when the change is in the way of increase of flow and particularly so when of considerable degree. One purpose of the present invention is to provide for changing this setting of an individual controller, or group thereof in a way such that while the shifting of the part that will result in setting to this new rate may be quickly made as is ordinarily most convenient, yet the rerating of the controller or controllers so initiated will take place slowly at a governed speed.

In the accompanying drawings Fig. 1 is a diagrammatic and perspective view comprising a filter bed which may be one of a group or series forming a complete plant as referred to above, and having a controller in the effluent line with my improved setting and governing means associated therewith.

Fig. 2 is a sectional view on line 2—2 of Fig. 1.

Fig. 3 is a diagrammatic view in perspective of an impulse transmitting device cooperating with the solenoids of Fig. 2.

Figure 1:
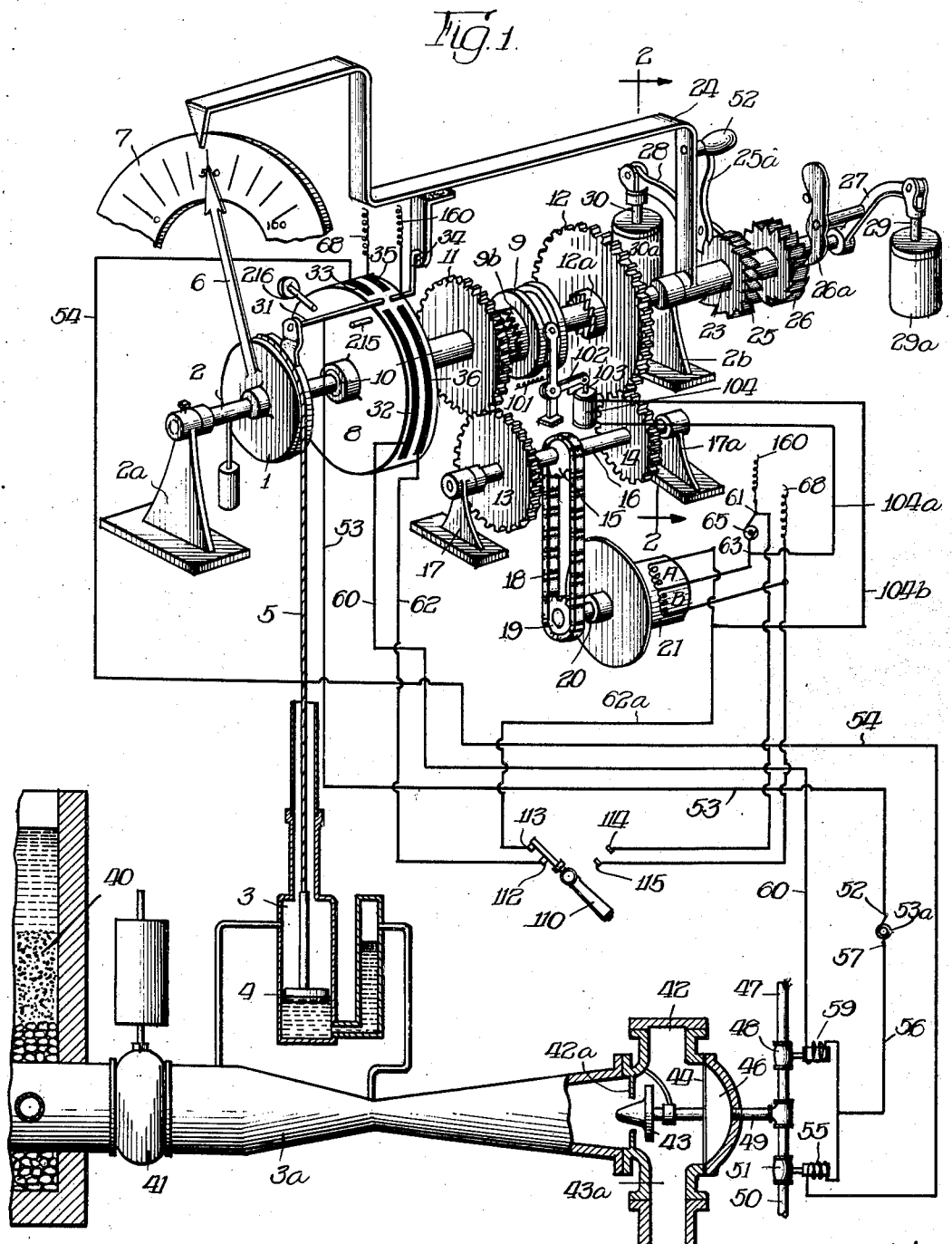

In Fig. 1, 1 is a sheave free to move on shaft 2 which is held stationary in supports 2a and 2b, 3 is a manometer connected to a Venturi tube 3a. In one leg of the manometer rides a float 4, a cable 5 has one end attached to the float 4, the other end being wound around sheave 1. As the flow of the fluid through Venturi tube 3a increases, float 4 moves downward causing a clockwise movement of sheave 1. A pointer 6, attached to sheave 1, moves over a scale 7 calibrated in suitable units of the flow through venturi 3a, thereby indicating the rate of flow.

A disc 8 is attached to sleeve 10, this sleeve being free to rotate upon stationary shaft 2. Clutch 9 is mounted upon sleeve 10, rotates therewith, and is longitudinally movable thereon. Gears 11 and 12 are free to rotate on sleeve 10 and are prevented from movement longitudinally along the sleeve by means of set collars not shown. Gears 13 and 14 and sprocket 15 are fixed to shaft 16, free to rotate in bearings 17 and 17a. Sprocket 15 is connected by a chain or cable 18 to sprocket 19 mounted on the shaft 20 of a reversible motor 21. The gears 11 and 13 also 12 and 14 are so chosen as to cause gear 12, which rotates in a clockwise direction when viewed facing the pointer 6, to rotate at a slower rate than gear 11 which moves in a counter-clockwise direction. This is done because 12 is used when the rate of flow is being increased and 11 when it is being decreased and it is ordinarily better to increase the flow at a slower rate than it may be decreased. By change of these gears or the ratio of sprockets 15 and 19 the rate of shift may be adjusted to suit conditions.

The clutch 9 has teeth 9a, not seen, on one face and teeth 9b on the other face, 9a and 9b being oppositely disposed as to rotational direction of engagement. The gear 12 has teeth 12a which are adapted to register with 9a and gear 11 has teeth 11a, not seen, adapted to register with teeth 9b. Teeth 9b and 11a are normally held in engagement by means of spring 101 and bell-crank 102. The free end of bell-crank 102 is attached to the plunger 103 of solenoid 104.

Mounted on shaft 2 and free to rotate thereon is a sleeve 23. Fixed on this sleeve 23 are a pointer member 24, ratchet 25 and ratchet 26. The teeth on ratchets 25 and 26 look in opposite directions. Adapted to engage teeth on ratchet 26 is a pawl 26a, pivotally mounted on lever 27, and adapted to engage teeth on ratchet 25 is a pawl 25a pivotally mounted on lever 28. One end of lever 27 is pivoted about shaft 2, the other end engaging the plunger 29 of a solenoid 29a. Similarly, one end of lever 28 is pivoted about sleeve 23, the other end engaging the plunger 30 of a solenoid 30a.

Mounted on sheave 1 and insulated therefrom is a contact arm 31 adapted to contact with either of the conducting segments 32 and 33 which are mounted on disc 8 and insulated therefrom. On pointer 24 and insulated therefrom is the contact arm 34 adapted to contact with either of the conducting segments 35 and 36 also mounted on disc 8 and insulated therefrom.

In Fig. 1, 40 is a filter bed, 41 is a valve, usually of the hydraulically operated type, 3a is a Venturi tube, 42 is a regulating valve through the outlet 43a of which the filtered water is carried to a point of storage or use. During operation of the filter, valve 41 is normally wide open and when the filter is put out of service, as for back-washing, the valve 41 is closed. Valve 41 is caused to open or close by means of a lever 110 operating a four-way cock or pilot valve, not shown, in the well known manner. When the lever 110 is in the position to open valve 41 the contacts 112 and 113 of a switch are bridged; when the lever 110 is in the valve closing or closed position contacts 114 and 115 are bridged.

The head available for causing flow from the filter usually continually decreases during the operation of the filter because of the clogging up of the filter bed by deposited sediment as filtration progresses. As the rate of flow through the bed is to be kept at a substantially constant rate, the regulating valve 42 is employed to afford a variable resistance to the passage of water which may be adjusted inversely to the resistance of the filter bed. The variable restriction in the regulating valve is provided by a valve seat 42a and a movable plunger 43 attached to flexible diaphragm 44. This diaphragm is subjected on one side to the pressure in compartment 46, this pressure being subject to controlled variations by either admitting water under pressure through pipe 47, solenoid operated valve 48 and pipe 49, or permitting water to pass out through pipes 49 and 50 and solenoid operated valve 51 to any suitable point of discharge.

In Fig. 1, the pointer 24 is shown as having been set by means of knob 52 to a position on the scale representing some pre-determined desired rate of flow and the figure shows the condition of the various parts while this rate of flow is being maintained. If a decrease from the rate should occur through the fluid conducting system that includes venturi 3a the pressure differential will decrease and level of the mercury on which float 4 rides will rise. This will cause a counter-clockwise movement of sheave 1 and contact arm 31 will move onto contact ring 33. Electric current will now flow from terminal 52 of source of E. M. F. 53a, through conductor 53 to contact 31, to ring 33, conductor 54, solenoid 55 of valve 51, through conductor 56 to terminal 57 of 53a. Solenoid 55 will therefore be energized and open valve 51 which will permit passage of water from compartment 46 to waste allowing diaphragm 44 and hence plunger 43 to move so as to increase the opening between plunger 43 and valve seat 42a. This will cause an increase of flow through the fluid conducting system with a consequent gradual lowering of the mercury level whereon float 4 rides and also a motion of contact 31 (now on ring 33) toward the neutral point. When the contact 31 reaches the neutral point (which is its original position corresponding to the desired rate of flow) the circuit of solenoid 55 will be broken and valve 51 will close, holding the flow at the predetermined rate.

Conversely if there should be an increase of flow through the fluid conducting system, the float 4 will fall, causing contact 31 to move onto ring 32 of disc 8. Electric current will now flow from terminal 52 of source of E. M. F. 53a through conductor 53, contact 31, ring 32, conductor 60, solenoid 59 and conductor 56 to terminal 57. Solenoid 59 will then be energized, opening valve 48 allowing pressure water from 47 to enter compartment 46 moving diaphragm 44 and plunger 43 toward seat 42a and thus diminishing the flow. This is accompanied by a rise of the float 4 and movement of contact 31 toward the neutral point on disc 8. When the neutral point is reached, the circuit of solenoid 59 of valve 48 is broken and valve 48 will close holding the flow at a predetermined rate.

Should it be desired to increase the set rate of flow, the pointer 24 may be moved by means of knob 52 to a position on the scale 7 indicating the desired higher rate. The contact pin 34 will now be on ring 36 of disc 8 and an electric circuit will be established between source of E. M. F. 65 and coil A of motor 21 as follows: From terminal 61 of 65, conductor 160 (shown broken) contact 34, ring 36, conductor 62, contacts 112 and 113, conductor 62a, coil A of motor 21 to terminal 63 of 65. A complete electrical circuit will also be established through solenoid 104 operating bell-crank 102, as follows: From terminal 61 of E. M. F. 65, conductor 160, contact 34, ring 36, conductor 62, contacts 112 and 113, conductors 62a and 104b, solenoid 104, conductor 104a to terminal 63 of 65. This will energize solenoid 104 which through bell-crank 102 will move the clutch into engagement with teeth of gear 12. At the same time motor shaft 20 will start to rotate in a counterclockwise direction (facing shaft end) and through sprocket 19, chain 18, sprocket 15, gears 14 and 12 and clutch 9 will cause disc 8 to rotate in a clockwise direction until ring 36 leaves contact 34, when the circuits of the motor 21 and solenoid 104 will be broken and clutch 9 returned to engagement with teeth in gear 11. In the meantime ring 33 will have moved onto contact pin 31, establishing the circuit through solenoid 55 of valve 51 which will have opened the chamber 46 to waste, thereby permitting a greater opening between plunger 43 and seat 42a and therefore a greater rate of fluid flow through the system. When the new desired rate is reached, contact 31 will move off ring 33 onto the neutral position, solenoid 55 will be de-energized and solenoid valve 51 will close.

For decreasing the rate of flow the pointer 24 is set corresponding to the required lower flow. This will cause contact 34 to contact with ring 35 on disc 8. A complete electric circuit will now be established through coil B of motor 21 as follows: Starting from terminal 61 of E. M. F. 65 current will travel through conductor 160, contact pin 34, ring 35, conductor 68 (shown broken) to coil B of motor 21 and to terminal 63 of 65. The motor shaft 20 will now rotate in a clockwise direction and by means of sprocket 19, chain 18, sprocket 15, gears 13 and 11 and clutch 9 will cause disc 8 to rotate in a counter-clockwise direction until ring 35 leaves contact 34 when the motor 21 will stop. In the meantime contact pin 31 will be on ring 32 whereupon a circuit will have been established through solenoid 59 of valve 48 thereby causing movement of diaphragm 44 and plunger 43 toward seat 42a, restricting the flow. When the predetermined rate of flow is reached contact pin 31 will leave ring 32, de-energizing solenoid 59 and closing valve 48, thereby establishing the newly set rate of flow as before described.

In filtration plants employing a plurality of filter beds it is as above referred to convenient to be able to set the rate of flow for the several filters from a central location remotely located from the mechanism above described. This may be accomplished as follows:

Referring to Fig. 2: When the solenoids 29a and 30a are de-energized the levers 27 and 28 are held against stops 27a and 28a by springs 27b and 28b respectively. Pawl 26a is kept out of engagement with ratchet 26 by spring 26b and against stationary stop 26c. Pawl 25a is kept out of engagement with ratchet 25 by spring 25b and against stationary stop 25c. If now, solenoid 29a should be energized the lever 27 and its pawl 26a will move downward until the end of 27 strikes the end of the solenoid, which serves as a stop, this movement corresponding to the angle of one tooth on ratchet 25. The extended portion 26d of pawl 26a will cause a forward movement of the lower end of pawl 26a causing it to mesh with the ratchet 26 and hence a clockwise movement of pointer 24 of a predetermined angular magnitude, since both ratchets 25 and 26 and pointer 24 are all mounted on sleeve 23. Each energizing impulse of solenoid 29a will thus produce equal angular movements of pointer 24 in a clockwise direction. Similarly each impulse of solenoid 30 will produce similar angular movements of pointer 24 but in a counter-clockwise direction. It is therefore seen that the position of pointer 24 may be changed and hence the rate for which the controller is to be set may be varied a desired amount either upward or downward, by energizing solenoid 29a or 30a the proper number of times. As indicated in Fig. 2 the ratchets 25 and 26 may be segmental, having a number of teeth corresponding to the working range and thus avoid jamming or over-setting.

The wiring to solenoids 29a and 30a is not shown in Fig. 2 and may be made in any convenient manner according to common practice. As a matter of convenience however, and particularly when it is desired to set a number of controllers from a common point it is desirable to provide mechanism for this and one form thereof is shown in Fig. 3. In Fig. 3, 29' and 30' represent solenoids 29a and 30a of a plurality of mechanisms as shown in Fig. 2, each of which forms part of a mechanism as shown in Fig. 1, each with a filter bed and so forming a multiple unit plant, associated with a common setting device, remotely located at a central control station. A reversible motor 170 drives the friction disc 171 through shaft 172 and thus the larger disc 173 on shaft 174. Disc 171 is shiftable on disc 173 by lever 175 so as to provide for changing speed of shaft 174. Disc 73 is fixedly attached to shaft 174. Shaft 174 is free to rotate in the bearings 74 and 74a. A pointer 75, to which is attached contact 81 insulated therefrom, and a knob 76, is free to rotate about the outside of sleeve 78, which is part of the bearing 74. Pointer 75 registers with dial 77, calibrated as desired as in rates of flow. On the periphery of disc 73 are the two rings 79 and 80, which are insulated from 73 and from each other. Also mounted on disc 73 and insulated therefrom are a plurality of segments 81 electrically communicating with one another.

In the position shown in Fig. 3 contact 81 is out of contact with rings 79 and 80, therefore both electric circuits comprising the motor 170, E. M. F. 82 and conductors 83 and 84 are broken, as are also the circuits comprising solenoids 30' and 29', conductors 85, 86, 87, 88, 89, contact 95 and segments 181.

Assume now, we wish to increase the rate of flow through the remotely located filters. By means of knob 76, pointer 75 is made to register with the desired new rate as indicated on dial 77. Contact 81 will then move onto ring 79 which will establish a circuit from terminal 90 of E. M. F. 82, through one coil circuit, say A, of the motor 82, conductor 83, ring 79, contact 81, conductor 93 and back to terminal 91 of E. M. F. 82. The motor will then rotate in the direction to drive disc 73 in a counter-clockwise direction until contact 81 will move from off ring 79 to the neutral point between rings 79 and 80, whereupon the motor 70 and disc 73 will stop. Disc 73 in assuming its new position will have caused contact 95 to contact with the segments 181 as they pass thereunder, thereby energizing the circuit of solenoids 29' a predetermined number of times as follows: From terminal 90 of E. M. F. 82 to conductor 89, segments 181, contact 95, conductors 88 and 86, solenoids 29', conductors 87 and 83, ring 79, contact 81, conductor 93 to terminal 91 of 82.

If it is desired to decrease the rate of flow of the remotely located filters, pointer 75 is moved in the opposite direction. Contact pin 81 will now contact with ring 80 establishing a circuit through winding B of motor 70 as follows: From terminal 90 of E. M. F. 82 to winding B, conductor 84, ring 80, contact 81 and conductor 93 to terminal 91 of E. M. F. 82. At the same time the circuit of the solenoids 30' will be intermittently energized, the circuit being as follows: Terminal 90 of E. M. F. 82, conductor 89, segments 181, contact 95, conductor 86, solenoids 30', conductors 85 and 84, ring 80, contact 81, conductor 93 and back to terminal 91 of 82. The angular movement of the disc 71 and the number of times solenoids 30' will be energized will be as given in the explanation for an increase in the desired rate. Ordinarily it is indifferent how rapidly the disc 73 is rotated and the impulses transmitted to the solenoids 29' and 30', for no matter how rapidly the pointer or rate setter member 24 is shifted it is the motion of disc 8 that determines the rate of shift of the flow to the new value. However the motion of disc 73 may be used for a similar purpose without slow motion of 8 for by governing its rotation the interval between impulses may be made anything desired and so the time for a shift of flow. It is desirable to make the teeth on ratchets 25 and 26 and the motion of pawls 25a and 26a small in such case so that each increment of flow will be small. By changing the position of disc 171 on disc 173 the speed of rotation may be altered so as to time the impulses for any desired rate of change of flow.

When it is desired to backwash a filter, the effluent valve as 41 is closed and remains closed until the filter is to be restored to service. It has been found desirable after a filter had been backwashed or the flow otherwise cut off, to start the filtration process at a slow and gradually accelerated rate until the desired rate of flow is attained and thereafter to maintain this rate evenly. This is accomplished as follows:—

When the handle 110 is moved to the position to close valve 41 the contacts 112 and 113 are open circuited and the contacts 114 and 115 are bridged. This breaks the circuit of coil A of motor 21 and of solenoid 104 and completes the circuit of coil B of motor 21 and the E. M. F. 65. The motor will therefore rotate in a clockwise direction and turn disc 8 in a counter-clockwise direction until further movement in this direction is limited by stop 215 on disc 8 meeting stationary stop 216. (The motor will then be stalled but the one employed is of a type not thereby injured.) In the meantime pointer 6 and associated contact 31 will move toward and to the zero scale position. The relative positions of stops 215 and 216 are such that when disc 8 can move no farther and the pointer 6 is at zero on the scale the contact 31 will rest on ring 32 thereby energizing solenoid 59 of valve 46, which closes the regulating valve 42. At the same time contact 34 rests on ring 36 but since the circuit of which these and coil A of motor 21 are a part is broken at contacts 112 and 113, coil A is disconnected from the E. M. F. 65.

When the filter is to be put back into service the handle 110 is moved to the open position, breaking the bridge between contacts 114 and 115 and bridging contacts 112 and 113. This will start motor 21 in a counter-clockwise direction and energize solenoid 104 which will place clutch 9 in engagement with gear 12. The latter and also disc 8 will move in a clockwise direction. The electrical circuit established to accomplish this is as follows: From terminal 61 of E. M. F. 65, conductor 160, contact 34, ring 36, conductor 62, contacts 112 and 113, conductor 62a, coil A to terminal 63 of E. M. F. 65. Also from conductor 52a through conductor 104b, solenoid 104, conductor 104a, to terminal 63 of E. M. F. 65. When the neutral point between rings 35 and 36 reaches contact 34 motor 21 will stop, solenoid 104 will be de-energized and disc 8 will stop at the position corresponding to the rate of flow for which the pointer 24 is set.

When disc 8 started its motion away from the zero position, valve 42 was closed for the reason that contact 31 rested on ring 32. Because valve 42 was closed, pointer 6 and associated contact 31 did not move. However, because of the movement of disc 8, ring 32 moved from under contact 31 and contact 31 moved into ring 33. This caused the opening of valve 42, permitting a flow through Venturi tube 3a. The float 4 in manometer 3 will fall, moving pointer and contact 31 in a clockwise direction. Since the clockwise movement of disc 8 is at a slow rate as explained above and as this rate is lower than that at which the pointer 6 and contact 31 will ordinarily travel, contact 31 will leave ring 33, enter the neutral zone between rings 33 and 32. This will then close valve 51 and contact 31 will stop its motion until ring 33 moves forward enough to again make contact with 31, thus opening 51 and thereby increasing the opening of valve 42. This process is continued until the neutral zone between rings 35 and 36 reaches contact 34. It is evident then that the pointer 6 cannot reach the rate for which the apparatus is set in less than the predetermined time it takes disc 8 to travel from zero to the desired rate.

For purposes of illustration I have shown and described one form in which my invention may be embodied but of course many changes in details and form may be made without departing from the conception and teaching thereof. Such changes will no doubt occur to those skilled in the art and may in some instances or respects be of some advantage. The appended claims are accordingly to be given as broad a scope as the disclosure and the prior art warrant.

I claim:

1. A conduit for fluid flow, a flow controlling valve on said conduit, a member adapted to be positioned by and to indicate the flow through said conduit, a second member adapted to be positioned according to flow desired through said conduit, means comprising a third movable member associated with said first two movable members whereby on motion of said indicative member beyond predetermined limits relative to the said third member said valve will be repositioned, and means whereby when said second member has been positioned to a new rate of flow said third member will be caused to move at a relatively slow rate to a corresponding new position.

2. A conduit for fluid flow, a rate of flow controller that comprises a regulating valve on said conduit, a rate of flow indicating member operatively associated with said conduit, to indicate the rate of flow therethrough, a rate setting member associated with said rate indicating member, means operatively joining said members and said valve whereby on relative motion of said indicating member or said setting member beyond predetermined limits said valve will be repositioned, said means including means whereby the repositioning of said valve will be caused to take place slowly when such repositioning follows motion of said setting member.

3. A conduit for fluid flow, a rate of flow controller comprising a valve on said conduit, a second valve on said conduit, a rate setting member operatively associated with said controller, operating means associated with said second valve to open and close same, means associated with said second valve whereby when said second valve is actuated to close, said rate controller is separated from said rate setter and the valve thereof caused to close and when said second valve is actuated to open the influence of the rate setter is restored, and intermediate means for limiting the speed with which the flow is restored to the full set value.

4. A conduit for fluid flow, a rate of flow controlling member comprising a valve on said conduit, rate setting means including a movable setting member associated with said controller for determining the allowed flow, a second valve on said conduit, operating means associated with said second valve for causing same to open and close, means associated with said operating means whereby when said second valve is actuated to close, said controller is separated from said rate setter and the valve thereof actuated to close and when said second valve is actuated to open the controller is restored to the influence of the rate setter, a movable member coacting with and intermediate between said rate setting and rate controlling members and means whereby said intermediate member may be moved at a relatively slow predetermined rate so as to limit the rate of change of flow through the controlling member.

5. A conduit for fluid flow, a rate of flow controlling member on said conduit, said member being biased to hold the flow at a set rate, a movable setting member for fixing the flow value to which the controller is biased, means for shifting said setting member from a point relatively remote therefrom whereby to bias the controlling member to a new flow value and means whereby regardless of the rapidity of shift of the setting member the bias of the controlling member is shifted relatively slowly from the old value to the new.

6. A fluid flow system comprising a conduit, a flow controlling member thereon, said member being biased to hold the flow at a set value, a rate of flow indicating member and a rate setting member, an intermediate member operatively associated with both said indicating member and said setting member, means for shifting said rate setting member to determine a new flow value, and means effective upon such shift to move said intermediate member at a relatively slow rate to a new position corresponding to that of the setting member.

7. The combination with a rate of flow controller of the type biased to hold a flow at a set value, of a movable rate setting member that may be quickly moved to set to a new flow value, a second movable member whose rate of shift determines the rapidity with which the flow may be altered from an old value to a new, and means for moving said second movable member at a predetermined speed.

8. In a fluid flow system, a conduit, a flow controller member comprising a valve on said conduit, said controller being biased to hold the flow at a set rate, a movable rate setting member for said controller that may be quickly shifted to set to a new flow value, a movable member the position of which determines the bias of the controller member and means effective on shift of the setting member to slowly move said movable member to a new position corresponding to the new set value whereby the flow permitted by the controller is correspondingly slowly altered to the new value.

9. In a flow control system, a conduit for fluid flow, a flow controller on said conduit, said controller being biased to hold the flow at a set rate, a member whose position is indicative of the existing flow, a movable setting member cooperative to determine the rate to which the controller is biased, a movable member intermediate said indicative member and said setting member and cooperating with the first as to maintaining flow at some set value and with the second to shift the flow to some new value, and means rendered operative on shift of said setting member to a new position to move said intermediate member to a corresponding position.

10. The apparatus of claim 9 in which the movement of the intermediate member is at a predetermined relatively slow rate.

11. The apparatus of claim 9 in which the movement of the intermediate part is at a different rate when shifting for an increased flow than when shifting for a decreased flow.

12. The apparatus of claim 9 wherein the means for moving the intermediate part may be altered so as to change the speed with which the intermediate part is moved.

13. A plurality of conduits for fluid flow, a flow controller comprising a valve on each of said conduits, each of said controllers being biased to hold the flow therethrough at a set value, a member joined to each of said conduits in a manner such that its position is indicative of the flow therethrough, a setting member associated with each controller whose position is determinative of the value to which the flow therethrough will be biased, a remote control station common to all said controllers, means at said station whereby impulses may be transmitted therefrom to shift said setting members, and means at each controller adapted to control the rate of change from one flow value to another.

14. The apparatus of claim 13 wherein there is at said remote station a setting member that may be shifted and wherein the degree of such shift determines the number of such impulses that will be transmitted.

15. A fluid flow system comprising a conduit, a flow control member on said conduit, said control member being biased to hold the flow therethrough at a set value, a shiftable setting member so joined to said control member that its position is determinative of the flow value to which the control member will be biased, said setting member being shiftable manually, a control station remote from said control member, a second shiftable setting member at said control station, means operatively joining said first and second setting members such that upon shift of the latter the former will be caused to shift a corresponding amount, said means comprising a motor member that will be started upon shift of said second shiftable member and thereupon operate to produce a motion proportionate to the amount of shift of said second shiftable member.

16. In a fluid flow system the combination of a conduit for fluid flow, a flow controller comprising a regulating valve on said conduit, said controller being biased to normally hold the flow at a set value, a shut-off valve on said conduit, means associated with said shut-off valve for causing said regulating valve to move toward closed position when the shut-off valve is caused to close and to cause said regulating valve to open when said shut-off valve is caused to open, and means whereby the opening motion of said regulating valve is impeded resultantly of too rapid increase of flow through said conduit.

17. A flow control system comprising in combination a conduit for fluid flow, a flow controller on said conduit, said controller being of the type that is biased to hold the flow at a set value, a movable member whose position is determinative as to the flow value to which said controller is biased, and means for moving said member at a slow rate from one position to another whereby the shift of flow from one value to another is correspondingly slow.

18. A conduit for fluid flow, a rate of flow controlling device on said conduit, said device being biased to hold the flow to a set rate, a movable setting member whereby the flow value to which the controller is biased may be altered, means for shifting said setting member, and means for controlling the rate of shift of the bias of the controlling device from an old value to a new, irrespective of the rapidity of shift of the setting member.

19. A fluid flow apparatus comprising flow control means adapted to bias the flow to a predetermined set value, means for shifting the control to bias the flow to different set values and means for controlling the rate of the shift of the control bias from an old to a new value.

20. Apparatus as described in claim 19 comprising also means for limiting the rate of change in flow in shifting from an old to a new value.

WALTER H. GREEN.